United States Patent
Shigapov et al.

(10) Patent No.: US 6,813,884 B2
(45) Date of Patent: Nov. 9, 2004

(54) METHOD OF TREATING DIESEL EXHAUST GASES

(75) Inventors: Albert Nazipovich Shigapov, Aachen (DE); Brendan Patrick Carberry, Aachen (DE); Robert Walter McCabe, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/683,642

(22) Filed: Jan. 29, 2002

(65) Prior Publication Data

US 2003/0140620 A1 Jul. 31, 2003

(51) Int. Cl.$^7$ ................................................. F01N 3/00
(52) U.S. Cl. ........................... 60/295; 60/274; 60/311; 60/297
(58) Field of Search .................. 60/295, 297, 311; 423/215.5; 55/DIG. 30

(56) References Cited

U.S. PATENT DOCUMENTS

| | | | |
|---|---|---|---|
| 3,193,491 A | | 7/1965 | Cramer et al. |
| 4,717,708 A | | 1/1988 | Cheng et al. |
| 4,902,487 A | | 2/1990 | Cooper et al. |
| 4,934,142 A | * | 6/1990 | Hayashi et al. ............. 422/169 |
| 5,039,644 A | | 8/1991 | Lachman et al. |
| 5,061,464 A | | 10/1991 | Cordonna, Jr. et al. |
| 5,100,632 A | | 3/1992 | Dettling et al. |
| 5,451,558 A | | 9/1995 | Campbell et al. |
| 5,518,978 A | | 5/1996 | Flego et al. |
| 5,538,931 A | | 7/1996 | Henrichs et al. |
| 5,746,989 A | * | 5/1998 | Murachi et al. ............. 423/212 |
| 5,851,947 A | | 12/1998 | Hair et al. |
| 6,013,599 A | * | 1/2000 | Manson ........................ 502/325 |
| 6,023,930 A | * | 2/2000 | Abe et al. ....................... 60/311 |
| 6,185,934 B1 | * | 2/2001 | Teboul ........................ 55/385.3 |
| 6,248,689 B1 | * | 6/2001 | Manson ........................ 502/340 |
| 6,293,096 B1 | * | 9/2001 | Khair et al. .................... 60/286 |
| 6,294,141 B1 | * | 9/2001 | Twigg et al. ................. 422/169 |
| 6,375,910 B1 | * | 4/2002 | Deeba et al. ................. 422/180 |
| 6,412,276 B1 | * | 7/2002 | Salvat et al. ................... 60/295 |
| 2003/0104932 A1 | * | 6/2003 | Kim ............................ 502/216 |

FOREIGN PATENT DOCUMENTS

| | | |
|---|---|---|
| EP | 0 160 482 | 1/1989 |
| EP | 0 658 369 A2 | 6/1995 |
| EP | 0 341 832 | 1/1996 |
| JP | 02-056250 | * 2/1990 |
| WO | WO 99/39809 | 8/1999 |

* cited by examiner

Primary Examiner—Thomas Denion
Assistant Examiner—Diem Tran
(74) Attorney, Agent, or Firm—Damian Porcari

(57) ABSTRACT

A diesel exhaust treatment system and method of oxidizing NO to $NO_2$ at low temperatures are provided. The system utilizes a platinum catalyst on a zirconia-stabilized silica support which oxidizes NO in the exhaust gas to $NO_2$ and uses the $NO_2$ in an amount sufficient to oxidize particulate trapped on a particulate filter. The catalyst is preferably pre-treated at a temperature of between about 500 to 650° C. in a NO-oxygen-nitrogen mixture to increase conversion at low temperatures. The catalyst preferably includes an additional oxide component selected from the group consisting of $TiO_2$, $P_2O_5$, $WO_3$, $B_2O_3$, and $Al_2O_3$ or a heteropolyacid component to further increase activity at low temperatures or to decrease platinum loading at the same level of performance.

26 Claims, 2 Drawing Sheets

METHOD OF TREATING DIESEL EXHAUST GASES

BACKGROUND OF INVENTION

1. Field of the Invention

The present invention relates to a method of treating compression ignition engine exhaust gases such as diesel engine exhaust gases. More particularly, the present invention relates to a method which utilizes a catalyst to convert NO in diesel exhaust gas streams to $NO_2$ at low temperatures. The $NO_2$ (nitrogen dioxide) generated by the catalyst can then be used to promote regeneration of a downstream diesel particulate filter at low temperatures.

2. Background of the Invention

In recent years, environmental regulations in the United States and Europe for diesel particulate emissions have required the effective removal of particulate (generally consisting of carbonaceous particulates in the form of soot) from the diesel engine. A well-known method for removing soot from engine exhaust has been to collect the soot using a particulate filter or porous ceramic trap made from cordierite or SiC followed by oxidation of accumulated particulate at the high temperatures encountered in the exhaust.

However, lean-burn engines such as diesel engines operate at much cooler temperatures than gasoline engines. As a result, the lower temperature of the exhaust gases hinders the oxidation of particulate captured in the particulate filter. The use of catalytic traps capable of promoting particulate filtration and regeneration have been proposed as one solution to this problem. It has also been found that the presence of $NO_2$ in diesel exhaust results in oxidation of particulate at lower temperatures up to 300° C. $NO_2$ reaction with soot occurs even at room temperature, but the reaction time takes up to 2 orders of magnitude longer. Accordingly, it would be desirable to be able to use a catalyst to convert NO in diesel exhaust gas to $NO_2$ at the lowest possible temperature in order to increase the rate of particulate combustion.

Diesel catalysts have been proposed containing platinum, which is active at temperatures below about 300° C. Among catalysts studied, the Pt/silica catalyst exhibited the best activity; however, it exhibited low activity below 250° C. The same catalyst was the most active in particulate combustion due to the effective NO oxidation to $NO_2$. There are thermodynamic limitations of NO conversion to $NO_2$ at temperatures exceeding 250° C. While it is impossible to achieve high conversion of NO to $NO_2$ at higher temperatures due to the thermodynamic limitations, the development of catalysts which are active at temperatures between about 175 to 250° C. could lead to practically complete conversion. It would be desirable to improve the activity of catalysts at low temperatures and improve the thermal stability of catalysts for NO oxidation to $NO_2$.

Accordingly, there is still a need in the art for a method of treating compression ignition exhaust gases such as diesel engine exhaust gases which can successfully convert NO to $NO_2$ at temperatures of less than 250° C.

SUMMARY OF INVENTION

The present invention meets that need by providing an improved method for converting NO in diesel engine exhaust gases to $NO_2$ at low temperatures utilizing an oxidation catalyst comprising platinum and a support material comprising zirconia-silica. The resulting $NO_2$ promotes regeneration of the diesel particulate filter (i.e., combustion of trapped carbonaceous particulate) at a temperature less than about 250° C., or accumulates on NOx trap material for particulate combustion at higher temperatures.

According to one aspect of the present invention, a diesel exhaust gas treatment system is provided comprising an oxidation catalyst positioned in an exhaust gas passage of a diesel engine for converting at least a portion of NO contained in the exhaust gas to $NO_2$. The oxidation catalyst comprises platinum and a support material comprising zirconia-silica. The system also includes a particulate filter for receiving the exhaust gas containing $NO_2$, where the $NO_2$ enables oxidation of particulate trapped on the filter, thereby promoting regeneration of the filter.

The conversion of NO to $NO_2$ preferably occurs at a temperature range of between about 175 to 350° C., and more preferably at a temperature of between about 200 and 250° C. The oxidation of particulate preferably occurs at a temperature less than about 250° C.

The oxidation catalyst is preferably positioned between the exhaust passage and the particulate filter. The oxidation catalyst preferably comprises from about 1 to 5 wt. % platinum on the support. The support contains from about 3 to 20 wt. % zirconia, and the balance silica. To increase the activity of the catalyst, or decrease Pt loading at the same level of performance, the catalyst also preferably includes one or more oxides selected from the group consisting of $TiO_2$, $P_2O_5$, $WO_3$, $B_2O_3$, and $Al_2O_3$, or a heteropolyacid selected from $H_3PW_{12}O_{40}$ and $H_4SiW_{12}O_{40}$.

The system may optionally include a second catalyst positioned downstream from the particulate filter for NOx reduction. The second catalyst preferably comprises a selective reduction catalyst, which is capable of reducing nitrogen oxides such as $NO_2$ and NO into nitrogen ($N_2$) or nitrous oxide ($N_2O$). In addition, reductants such as ammonia, urea, or diesel fuel may be added to the second catalyst to aid in reduction.

In another embodiment of the invention, the system may include a NOx trap positioned downstream from the oxidation catalyst. This NOx trap may be combined with a particulate filter according to the method developed by Toyota Motor Corp. (Automotive Engineering International/ October 2000, p.119) for simultaneous removal of NOx and particulate. According to another aspect of the present invention, a method for treating diesel exhaust gases is provided in which an oxidation catalyst is positioned in the exhaust gas passage of a diesel engine, where the catalyst comprises platinum and a support material comprising zirconia-silica. The oxidation catalyst is exposed to diesel exhaust gas such that at least a portion of NO contained in the exhaust gas is converted to $NO_2$. The $NO_2$ is then passed through a particulate filter provided downstream of the oxidation catalyst in an amount sufficient to oxidize particulate trapped on the filter.

The method preferably includes pretreating the oxidation catalyst in a gas mixture containing NO, $O_2$ and $N_2$ prior to positioning the catalyst in the exhaust stream. The gas mixture preferably comprises about 500 ppm of NO, about 3% by volume $O_2$, and the balance $N_2$. The pretreatment is preferably carried out a temperature of between about 500 to 650° C.

The method also preferably includes adding one or more oxides (such as, for example, $TiO_2$, $P_2O_5$, $WO_3$, $B_2O_3$, and $Al_2O_3$) to the catalyst to further improve the performance prior to positioning the catalyst in the exhaust stream, or adding a heteropolyacid such as, for example, $H_3PW_{12}O_{40}$ and $H_4SiW_{12}O_{40}$.

The method of the present invention results in a high conversion of NO contained in the exhaust gas to $NO_2$ of from about 60% to about 96% at a temperature of about 175 to 250° C.

The method may further include providing a second catalyst downstream of the particulate filter to aid in reducing NOx. The second catalyst is preferably a selective reduction catalyst as discussed above.

The method may also include positioning an NOx trap downstream from the oxidation catalyst (between the oxidation catalyst and the particulate filter) or combining the trap with the particulate filter.

Accordingly, it is a feature of the present invention to provide a diesel exhaust treatment system and method for converting NO to $NO_2$ at low temperatures. This, and other features and advantages of the present invention, will become apparent from the following detailed description, the accompanying drawings, and the appended claims.

DETAILED DESCRIPTION

We have found that catalysts containing platinum as the active metal supported on a zirconia-stabilized silica support provide a significant enhancement in low-temperature activity and thermal stability compared with similar catalysts prepared on either silica or zirconia alone. By activity, it is meant the conversion of NO to $NO_2$ by the catalyst at the same temperature and feed flow rate (space velocity). By thermal stability, it is meant that the conversion is achieved with little or no deactivation of the catalyst, i.e., no decrease in catalyst performance after treatment at high temperatures (in particular, 750° C.).

A preferred catalyst for use in the present invention is comprised of from about 1 to 5 wt. % platinum (Pt) on a support comprising from about 3 to 20 wt. % zirconia ($ZrO_2$), and the remainder silica ($SiO_2$). The $ZrO_2$—$SiO_2$ support is preferably formed by impregnating commercial silica gel with zirconium citrate ammonium complex followed by drying and calcination at 800° C. and subsequently impregnating the zirconia-stabilized silica with hexachloroplatinic acid.

We have found that the activity of the resulting $ZrO_2$-stabilized $SiO_2$ support can be further increased at low temperatures by adding additional oxide components which already have strong acidity or which generate additional acid cites when associated with $ZrO_2$-stabilized $SiO_2$. Suitable oxides include $TiO_2$, $P_2O_5$, $WO_3$, $B_2O_3$, and $Al_2O_3$.

Acid components such as the heteropolyacids $H_3PW_{12}O_{40}$ and $H_4SiW_{12}O_{40}$ may also be added. The addition of strong acids further increases the activity of the catalyst and/or allows the use of less platinum to achieve a given level of activity.

The oxide components and/or acids are preferably impregnated into the $ZrO_2$-stabilized silica support from the corresponding salts or acids in aqueous solution before impregnation with the platinum compound. The pKa of the resulting catalyst should be between about 5 to 13. We have also found that the activity of the catalyst is significantly increased at low reaction temperatures when the catalyst is preliminarily treated at a temperature of about 500 to 650° C. and exposed to a gaseous reaction mixture of about 500 ppm NO, 3% volume of $O_2$ and the remainder $N_2$.

Figure 1:
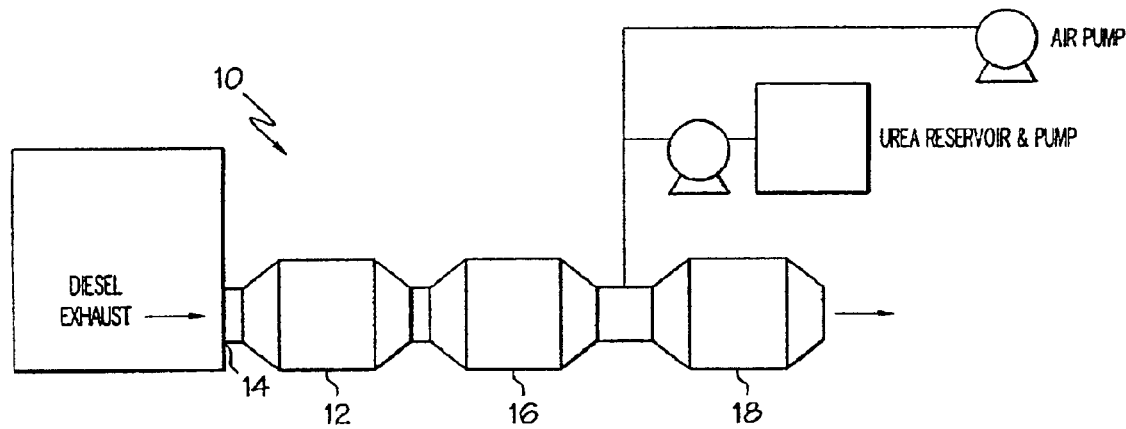
FIG. 1 is a schematic illustration of one embodiment the diesel exhaust gas treatment system of the present invention.

FIG. 1 is a schematic illustration of the diesel exhaust treatment system 10. As shown, the Pt/$ZrO_2$—$SiO_2$ catalyst 12 is preferably mounted between the outlet of the engine (exhaust manifold or turbocharger) 14 and a particulate filter 16.

As the catalyst is exposed to the diesel exhaust gas, at least a portion of the NO contained in the exhaust gas is converted to $NO_2$. In addition to oxidation of NO which exits the engine to $NO_2$, the catalyst will also oxidize gaseous hydrocarbon species and some heaver hydrocarbon species that would otherwise end up adsorbed on the diesel particulate filter or emitted to the air. The catalyst of the present invention will also oxidize carbon monoxide under typical conditions found in the exhaust. The catalyst may also be combined with other oxidation catalysts to provide complete oxidation of CO and hydrocarbons.

Figure 2:
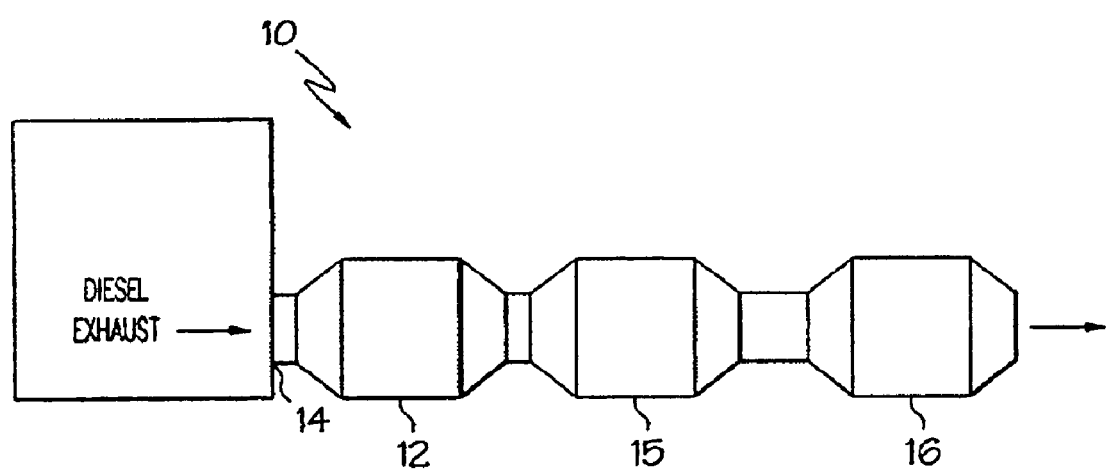
FIG. 2 is a schematic illustration of another embodiment of the diesel exhaust gas treatment system.

To complete the operation of the diesel exhaust treatment system, any remaining carbonaceous particulate material is captured in the particulate filter downstream from the catalyst and any remaining NOx compounds are converted. Generally, the $NO_2$ which is formed by oxidation in the Pt/$ZrO_2$—$SiO_2$ catalyst reacts with diesel particulate captured in the filter, giving up an oxygen atom for particulate oxidation and leaving as NO. The gaseous NO can be further reduced with an optional downstream catalyst system such as a urea-based selective catalyst reduction system 18 as shown, or with other reducing agents such as ammonia or diesel fuel. As shown in FIG. 2, NO can also be captured by a NOx trap 15 with the following simultaneous removal of NOx and particulate. The NOx trap 15 may be positioned between the catalyst 12 and the particulate filter 16 as shown, or it may be combined with the filter.

It should be appreciated that FIG. 1 represents only one possible configuration for the diesel exhaust treatment system of the present invention. The catalyst could also be combined in a common converter with the particulate filter or impregnated onto a suitably prepared diesel particulate filter. In this case, both the NO oxidation catalyst and the diesel particulate filter would be combined into one catalyst/filter body. The catalyst could also be combined with commercial diesel oxidation catalysts into one catalyst body.

It should also be appreciated that the catalyst of the present invention could be deposited onto either a ceramic or metallic substrate, preferably of monolithic design having, for example, a cylindrical or oval shape. Cell dimensions could be of conventional size [400 cells per square inch/6.5 mil wall thickness (ceramic)] or larger or smaller.

In order that the invention may be more readily understood, reference is made to the following examples, which are intended to be illustrative of the invention, but are not intended to be limiting in scope.

EXAMPLE 1

$ZrO_2$-stabilized Pt/$SiO_2$ oxidation catalysts were made in accordance with the present invention. The performance of the catalysts was tested in a fixed-bed tubular quartz reactor. The catalyst loading was selected as 66 mg for all samples. The samples were plugged with quartz wool. The reaction temperature was detected by a K-type thermocouple inserted into the catalyst bed. The flow of reagent gases was maintained by individual mass flow controllers. The concentrations of NO and $NO_2$ were continuously measured using an NO/$NO_x$ Beckman analyzer model 951A. All the activity measurements of the catalysts were obtained using a total feed flow rate of 100 cm$^3$/min. with a gas hour space velocity of 47250 h$^{-1}$. The composition of the reaction mixture was 500 ppm of NO, 3% vol. of $O_2$, and $N_2$ as the balance. To reduce Pt compounds in the samples to metallic platinum before testing, the samples were treated in a mixture of 3% $H_2$ in nitrogen. Some samples were also calcined in air before the catalysis. All reagent gases were supplied by Matheson and Airgas.

Activity measurements were carried out as follows. The fresh catalyst was first studied at 400° C., then at 350° C., 300° C., 250° C., 225° C., 200° C., 175° C., and 150° C., holding the catalyst each time until stationary activity was achieved, and at least 1 hour at each temperature. The temperature was then increased in reverse mode, holding the catalyst in the same manner at each temperature up to 400° C. The catalyst was then treated in the reaction mixture at elevated temperatures of 500° C., 600° C., 650° C., and 750° C. for 2 hours with new measurement of activity in the temperature range from 150° C. to 400° C.

Catalysts

The catalysts were prepared as follows. A commercial silica gel was obtained from Aldrich (silica gel for column chromatography, 70–230 mesh, 6 nm pores) and calcined at 800° C. for 2 hours.

A $ZrO_2$—$SiO_2$ support was prepared by impregnation of the calcined $SiO_2$ (silica gel), with a solution of zirconium citrate, ammonium complex (Aldrich) followed by drying at room temperature and calcination for 2 hours at 800° C. Different catalysts with zirconium contents of 3, 10 and 20 wt % of $ZrO_2$ were prepared.

Samples of Pt on $SiO_2$ and the $ZrO_2$-stabilized $SiO_2$ were prepared by impregnating the support with $H_2PtCl_6$-citric acid water solution having a molar ratio of Pt/citric acid= 1/10, followed by drying at room temperature and reduction in 3% $H_2/N_2$ mixture at 400° C. for 2 hours and calcinations in air at 400° C. for 2 hours. Platinum loading was varied from 0.4 to 1, 2 and 5 wt %. Other samples of Pt/$SiO_2$ and Pt/$ZrO_2$—$SiO_2$ were prepared by impregnation with a Pt$(NH_3)_4(NO_3)_2$ water solution followed by drying at room temperature, reduction, and calcinations under the same conditions described above.

Pt/$ZrO_2$—$SiO_2$ catalysts were also prepared containing a third component such as $TiO_2$, $P_2O_5$, $WO_3$, $B_2O_3$, $Al_2O_3$, $H_3PW_{12}O_{40}$ and $H_4SiW_{12}O_{40}$. These catalysts were prepared by impregnation of $ZrO_2$—$SiO_2$ with a water solution containing corresponding salts or acids of the third component (except $TiO_2$, where an ethanol solution was used). The loading of the third component was selected as 0.5 10$^{-3}$ mol per 1 g of support. The $TiO_2$—$ZrO_2$—$SiO_2$ sample was prepared by impregnation of 10 wt % $ZrO_2$—$SiO_2$ by ethanol solution of Ti$(OC_3H_7)_4$. The $P_2O_5$—$ZrO_2$—$SiO_2$ sample was prepared by impregnation of 10 wt % $ZrO_2$—$SiO_2$ with water solution of $H_3PO_4$. $WO_3$—$ZrO_2$—$SiO_2$ was prepared by impregnation of the same support with ammonium tungstate. $B_2O_3$—$ZrO_2$—$SiO_2$ was prepared by impregnation with $H_3BO_3$. $Al_2O_3$—$ZrO_2$—$SiO_2$ was prepared by impregnation with a solution of aluminum nitrate. The samples with heteropolyacids $H_3PW_{12}O_{40}$ and $H_4SiW_{12}O_{40}$ were prepared by impregnation with a solution of the corresponding heteropolyacid. The samples obtained were then impregnated with a solution of $H_2PtCl_6$-citric acid as described above.

Results

The performance of the catalysts is shown in Table 1 below.

TABLE 1

NO conversion to $NO_2$ over various catalysts.

| Catalyst | Pretreatment Temperature, ° C. | % NO conversion at reaction temperature | | | | | |
|---|---|---|---|---|---|---|---|
| | | 150° C. | 175° C. | 200° C. | 225° C. | 250° C. | 300° C. |
| 1 wt % Pt/$SiO_2$($H_2PtCl_6$) | 500 | — | 4.7 | 10.9 | 17.8 | 28.7 | 52.2 |
| | 600 | 0.4 | 6.3 | 12.4 | 21.3 | 34.8 | 59.3 |
| | 650 | 0.2 | 3.0 | 9.8 | 15.9 | 25.2 | 47.0 |
| | 750 | 0.1 | 2.1 | 5.4 | 9.3 | 15.0 | 28.4 |
| 1 wt % Pt/$SiO_2$(Pt$(NH_3)_4(NO_3)_2$) | 500 | — | — | 9.8 | 15.3 | 28.6 | 56.9 |
| | 600 | | 6.3 | 12.8 | 22.2 | 36.3 | 67.0 |
| | 650 | | 6.2 | 11.8 | 20.9 | 35.7 | 64.3 |
| | 750 | | 4.4 | 8.2 | 15.4 | 25.0 | 47.1 |
| 1 wt % Pt/$ZrO_2$(10%)-$SiO_2$($H_2PtCl_6$) | 500 | — | 7.7 | 13.9 | 25.3 | 41.3 | 69.1 |
| | 600 | 8.2 | 24.6 | 45.0 | 73.2 | 82.5 | 78.8 |
| | 650 | 10.9 | 28.1 | 50.3 | 78.6 | 87.3 | 78.7 |
| | 750 | 10.8 | 27.7 | 50.0 | 78.3 | 85.4 | 78.7 |
| 1 wt % Pt/$ZrO_2$(10%)-$SiO_2$(Pt$(NH_3)_4(NO_3)_2$) | 500 | — | — | 4.2 | 9.6 | 17.2 | 22.8 |
| | 600 | | | 21.3 | 34.1 | 51.1 | 76.0 |
| | 650 | | | 31.1 | 46.1 | 67.6 | 78.0 |
| | 750 | | | 26.5 | 44.2 | 63.0 | 78.0 |
| 5 wt % Pt/$SiO_2$($H_2PtCl_6$) | 500 | 3.9 | 23.5 | 49.5 | 76.5 | 87.0 | 78.2 |
| | 600 | 7.6 | 36.5 | 64.8 | 81.7 | 89.1 | 78.9 |
| | 650 | 7.1 | 28.2 | 48.5 | 65.8 | 74.3 | 78.6 |
| | 750 | 5.9 | 12.6 | 20.2 | 29.7 | 40.2 | 67.3 |
| 5 wt % Pt/$ZrO_2$(10%)-$SiO_2$($H_2PtCl_6$) | 500 | 12.0 | 25.4 | 41.3 | 58.6 | 79.3 | 74.7 |
| | 600 | 20.2 | 57.9 | 89.4 | 94.8 | 90.8 | 78.7 |
| | 650 | 22.3 | 64.8 | 96.0 | 95.3 | 91.4 | 78.7 |
| | 750 | 17.8 | 49.0 | 82.7 | 94.7 | 89.4 | 78.0 |
| 0.4 wt % Pt/$ZrO_2$(10%)-$SiO_2$($H_2PtCl_6$) | 500 | — | 3.9 | 8.7 | 15.2 | 28.2 | 53.2 |
| | 600 | 4.6 | 11.0 | 44.1 | 69.6 | 84.8 | 77.7 |
| | 650 | 6.2 | 14.6 | 50.3 | 74.5 | 85.6 | 78.7 |
| | 750 | 4.3 | 10.5 | 31.9 | 54.3 | 73.9 | 78.0 |

TABLE 1-continued

NO conversion to $NO_2$ over various catalysts.

| Catalyst | Pretreatment Temperature, °C. | % NO conversion at reaction temperature ||||||
|---|---|---|---|---|---|---|---|
| | | 150° C. | 175° C. | 200° C. | 225° C. | 250° C. | 300° C. |
| 2 wt % Pt/$ZrO_2$(10%)-$SiO_2$($H_2PtCl_6$) | 500 | — | 10.8 | 23.5 | 39.1 | 57.0 | 78.2 |
| | 600 | 22.1 | 65.0 | 94.3 | 95.6 | 91.6 | 78.2 |
| | 650 | 21.1 | 52.2 | 89.8 | 95.5 | 91.6 | 78.5 |
| | 750 | 15.3 | 43.4 | 84.9 | 93.9 | 90.5 | 78.0 |
| 1 wt % Pt/$ZrO_2$(3%)-$SiO_2$($H_2PtCl_6$) | 500 | — | 10.6 | 23.5 | 40.0 | 58.1 | 77.0 |
| | 600 | 9.8 | 29.7 | 58.0 | 84.9 | 89.2 | 78.5 |
| | 650 | 10.0 | 34.1 | 68.1 | 87.2 | 90.5 | 78.6 |
| | 750 | 8.6 | 23.9 | 43.0 | 71.2 | 86.0 | 78.5 |
| 1 wt % Pt/$ZrO_2$(20%)-$SiO_2$($H_2PtCl_6$) | 500 | — | 1.7 | 11.0 | 22.8 | 35.4 | 64.8 |
| | 600 | 8.9 | 21.3 | 42.0 | 71.1 | 86.4 | 78.8 |
| | 650 | 12.0 | 27.7 | 52.2 | 78.1 | 87.1 | 78.8 |
| | 750 | 9.1 | 25.8 | 51.3 | 76.7 | 86.0 | 78.3 |
| 1 wt % Pt/$TiO_2$(10%)-$SiO_2$($H_2PtCl_6$) | 500 | — | 7.8 | 20.4 | 36.7 | 53.9 | 76.0 |
| | 600 | 12.0 | 47.4 | 80.2 | 91.9 | 92.0 | 79.0 |
| | 650 | 15.2 | 50.1 | 80.9 | 95.3 | 91.9 | 79.1 |
| | 750 | 11.2 | 41.5 | 78.4 | 91.3 | 91.9 | 79.1 |
| 1 wt % Pt/$P_2O_5$—$ZrO_2$(10%)-$SiO_2$ ($H_2PtCl_6$) | 500 | — | 24.3 | 51.3 | 77.4 | 89.1 | 78.2 |
| | 600 | 15.2 | 41.3 | 78.3 | 95.2 | 91.4 | 78.5 |
| | 650 | 14.8 | 40.7 | 78.6 | 95.4 | 91.0 | 78.5 |
| | 750 | | 27.8 | 57.6 | 84.7 | 89.1 | 78.6 |
| 1 wt % Pt/$H_3PW_{12}O_{40}$—$ZrO_2$(10%)-$SiO_2$ ($H_2PtCl_6$) | 500 | — | — | — | — | — | — |
| | 600 | | | 91.1 | 95.0 | 91.8 | 78.7 |
| | 650 | | | 57.4 | 91.3 | 91.9 | 78.5 |
| | 750 | | | 24.3 | 50.5 | 64.6 | 78.2 |
| 1 wt % Pt/$H_4SiW_{12}O_{40}$—$ZrO_2$(10%)-$SiO_2$ ($H_2PtCl_6$) | 500 | — | 46.6 | 73.9 | 84.7 | 91.7 | 78.4 |
| | 600 | 15.4 | 60.2 | 95.6 | 94.9 | 91.9 | 78.1 |
| | 650 | 4.5 | 29.1 | 65.2 | 92.0 | 91.9 | 78.3 |
| | 750 | 1.8 | 18.2 | 41.7 | 71.3 | 88.9 | 78.1 |
| 1 wt % Pt/$Al_2O_3$—$ZrO_2$(10%)-$SiO_2$ ($H_2PtCl_6$) | 500 | — | 8.0 | 18.5 | 33.3 | 47.8 | 71.7 |
| | 600 | 11.3 | 41.5 | 74.3 | 95.6 | 90.7 | 78.2 |
| | 650 | 28.3 | 50.7 | 88.0 | 95.3 | 91.7 | 78.5 |
| | 750 | 13.5 | 34.1 | 67.2 | 93.1 | 89.1 | 78.0 |
| 1 wt % Pt/$B_2O_3$—$ZrO_2$(10%)-$SiO_2$ ($H_2PtCl_6$) | 500 | — | 51.2 | 92.6 | 95.0 | 91.4 | 78.3 |
| | 600 | 4.6 | 77.6 | 96.1 | 95.8 | 91.5 | 78.7 |
| | 650 | 2.7 | 53.2 | 93.9 | 94.5 | 91.7 | 78.6 |
| | 750 | 0.9 | 34.6 | 55.7 | 90.9 | 91.1 | 78.3 |
| 1 wt % Pt/$WO_3$—$ZrO_2$(10%)-$SiO_2$($H_2PtCl_6$) | 500 | — | — | 70.9 | 84.4 | 91.2 | 78.1 |
| | 600 | 15.9 | 61.2 | 91.6 | 92.9 | 91.8 | 78.3 |
| | 650 | 5.1 | 26.2 | 63.0 | 88.0 | 91.2 | 78.5 |
| | 750 | 2.7 | 22.3 | 44.0 | 77.3 | 90.8 | 78.5 |

The activity of the fresh catalyst 1 wt % Pt/$SiO_2$ prepared from $H_2PtCl_6$ was very low, but the activity improved after aging at 500 and 600° C. in the reaction mixture. The best NO conversation reached 61% at 300° C. after aging at 600° C. The aging at higher temperatures led to deactivation of catalyst after aging at 650° C. and 750° C. The Pt dispersion of this sample was low and decreased after aging according to XRD and CO chemisorption data.

The catalyst prepared from Pt($NH_3$)$_4$($NO_3$)$_2$ showed higher Pt dispersion. Catalyst deactivation after aging at 650° C. and 750° C. was lower. The aging led to progressively lower Pt dispersion according to CO chemisorption and XRD data. After aging at 650° C. the activity dropped.

The performance of 1 wt % Pt/10 wt % $ZrO_2$—$SiO_2$ catalyst was significantly different from that of the Pt/$SiO_2$ catalyst. Activity was low for the fresh catalyst, but the effect of aging on catalytic activity was significantly higher. After aging at 500° C., the catalyst reached an NO conversion of 59% at 350° C. After aging at 600° C., the activity increased and showed equilibrium conversion of NO at 300° C. After aging at 650° C., the activity increased, and conversion of 87.3% was close to that of equilibrium of 91.9% at 250° C.

NO conversion on the 1 wt % Pt/10 wt % $ZrO_2$—$SiO_2$ catalyst was 50%, while the Pt/$SiO_2$ samples did not exceed 13% at 200° C. The Pt/10 wt % $ZrO_2$—$SiO_2$ catalyst showed significant activity (28%) already at 175° C. In contrast to Pt/$SiO_2$, the deactivation was very small, even after severe aging at 750° C.

The 1 wt % Pt/$ZrO_2$(10%)—$SiO_2$(Pt($NH_3$)$_4$($NO_3$)$_2$) catalyst was less active, but showed the same tendency for activation after aging up to 650° C. and slight deactivation after aging at 750° C.

The comparison of NO oxidation on 5 wt % Pt/10 wt % $ZrO_2$—$SiO_2$ and 5 wt % Pt/$SiO_2$ (prepared from ($H_2PtCl_6$)) again revealed the superior performance of the Zr-containing sample as shown in Table 1. The Zr-containing sample showed an unusually high NO conversion of 95% at 225° C. after preliminary aging at 600 to 650° C. This catalyst converted more than 20% NO at 150° C. and more than 60% at 175° C. The deactivation of the Zr-containing sample was very low at high aging temperatures of 750° C. in contrast to 5 wt % Pt/$SiO_2$, where significant deactivation was observed at 650° C. aging.

The activity of 2 wt % Pt/10% $ZrO_2$—$SiO_2$ was close to that of 5 wt % Pt/10% $ZrO_2$—$SiO_2$ with NO conversion up to 95% at 200–225° C., but slight deactivation was found after aging at 650° C. and 750° C.

Also as shown in Table 1, the addition of $B_2O_3$ to the 1 wt. % Pt/$ZrO_2$-stabilized $SiO_2$ catalyst resulted in a superior performance with NO conversion of 96% at 200° C. and near 78% at 175° C. The catalyst was very active after preliminary aging at 500° C. and showed highest activity after aging at 600° C., but again aging at higher temperatures led to deactivation.

The Ti- and Al-containing samples were more thermally stable. 1 wt. % $Pt/TiO_2$—$ZrO_2$ (10%)—$SiO_2$ showed relatively stable NO conversion near 80% at 200° C. after aging at 600–750° C.

The addition of other oxides including Ce, Pr, La, V, Sn, Mg, Cu, Mn, Co, Fe, Cr and metallic Pd and Ag had a detrimental effect on the activity of $Pt/ZrO_2$-stabilized $SiO_2$. Without wishing to be bound to any particular theory, it appears that the higher activity of the catalyst is linked to the formation of additional acidity which is provided by the introduction of Zr and the addition of oxides/heteropolyacids, which modify the oxidation properties of platinum and promote $NO_2$ desorption from both Pt and the support at lower temperatures.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A diesel exhaust gas treatment system comprising:
   an oxidation catalyst positioned in an exhaust gas passage of a diesel engine for converting at least a portion of NO contained in said exhaust gas to $NO_2$ at a temperature between about 175° C. to 250° C., said oxidation catalyst comprising platinum and a support material comprising zirconia-silica, said support material having strong acid sites; and
   a particulate filter for receiving said exhaust gas.

2. The system of claim 1 wherein said oxidation catalyst is positioned between said exhaust passage and said particulate filter.

3. The system of claim 1 wherein said oxidation catalyst is combined with said particulate filter.

4. The system according to claim 1 further including a second catalyst positioned downstream from said particulate filter.

5. The system according to claim 4 wherein said second catalyst comprises a selective reduction catalyst.

6. The system according to claim 1 further including a NOx trap positioned downstream from said oxidation catalyst.

7. The system of claim 1 wherein said oxidation catalyst comprises from about 1 to 5 wt. % platinum on a support containing from about 3 to 20 wt. % zirconia, and the balance silica.

8. The system of claim 1 wherein said support includes one or more oxides selected from the group consisting of $TiO_2$, $P_2O_5$, $WO_3$, $B_2O_3$, and $Al_2O_3$.

9. The system of claim 1 wherein said support has been prepared with the addition of a heteropolyacid selected from $H_3PW_{12}O_{40}$ and $H_4SiW_{12}O_{40}$.

10. The diesel exhaust gas treatment system of claim 1 wherein said zirconia-silica support has been formed by impregnating silica gel with a zirconium citrate ammonium complex, drying said support, and calcinating said support at 800° C.

11. A method for treating diesel exhaust gases comprising:
   positioning an oxidation catalyst in an exhaust gas passage of a diesel engine, said oxidation catalyst comprising platinum and a support material comprising zirconia-stabilized silica, said support material having strong acid sites;
   providing a particulate filter downstream of said oxidation catalyst;
   exposing said oxidation catalyst to diesel exhaust gas containing NO such that at least a portion of said NO contained in said exhaust gas is converted to $NO_2$ at a temperature between about 175° C. to 250° C.; and
   passing said $NO_2$ through said particulate filter in an amount sufficient to oxidize particulate matter trapped on said filter.

12. The method of claim 11 wherein said oxidation catalyst comprises from about 1 to 5 wt. % platinum on a support containing from about 3 to 20 wt. % zirconia and the balance silica.

13. The method of claim 11 including pretreating said oxidation catalyst in a gas mixture containing NO, $O_2$ and $N_2$ prior to positioning said catalyst in said exhaust stream.

14. The method of claim 13 wherein said gas mixture comprises about 500 ppm of NO, about 3% by volume $O_2$, and the balance $N_2$.

15. The method of claim 13 wherein said pretreatment is carried out a temperature of between about 500 to 650° C.

16. The method of claim 11 including adding one or more oxides to said support prior to positioning said oxidation catalyst in said exhaust stream, said one or more oxides being selected from the group consisting of $TiO_2$, $P_2O_5$, $WO_3$, $B_2O_3$, and $Al_2O_3$.

17. The method of claim 11 including adding a heteropolyacid selected from $H_3PW_{12}O_{40}$ and $H_4SiW_{12}O_{40}$ to said support prior to positioning said oxidation catalyst in said exhaust stream.

18. The method of claim 11 wherein about 60% to about 96% of NO contained in said exhaust gas is converted to $NO_2$.

19. The method of claim 11 further including providing a second catalyst downstream of said particulate filter and passing said exhaust gas over said second catalyst.

20. The method of claim 19 wherein said second catalyst is a selective reduction catalyst.

21. The method of claim 11 further including a NOx trap positioned downstream of said oxidation catalyst.

22. The method of claim 11 wherein said conversion of NO to $NO_2$ occurs at a temperature of between about 200 to 250° C.

23. The method of claim 11 wherein said oxidation of particulate occurs at a temperature less than about 250° C.

24. A method for treating diesel exhaust gases comprising:
   positioning an oxidation catalyst in an exhaust gas passage of a diesel engine, said oxidation catalyst comprising platinum and a support material comprising zirconia-stabilized silica, said support material having strong acid sites;
   providing a particulate filter in combination with said oxidation catalyst;
   exposing said oxidation catalyst to diesel exhaust gas containing NO such that at least a portion of said NO contained in said exhaust gas is converted to $NO_2$ at a temperature between about 175° C. to 250° C.; and
   passing said $NO_2$ through said particulate filter in an amount sufficient to oxidize particulate matter trapped on said filter.

25. A diesel exhaust gas treatment system comprising:
   a particulate filter for receiving diesel exhaust gas from a diesel engine;
   an oxidation catalyst for converting at least a portion of NO contained in said diesel exhaust gas to $NO_2$ at a temperature between about 175° C. to 250° C., said oxidation catalyst comprising platinum and a support material comprising zirconia-silica, said support material having strong acid sites; wherein said oxidation catalyst is impregnated in said particulate filter.

26. A diesel exhaust gas treatment system comprising:

a first oxidation catalyst for converting at least a portion of NO contained in said diesel exhaust gas to $NO_2$ at a temperature of between about 175° C. to 250° C., said oxidation catalyst comprising platinum and a support material comprising zirconia-silica, said support material having strong acid sites; and a second oxidation catalyst different from said first oxidation catalyst; wherein said first and second oxidation catalyst are positioned in combination in the exhaust gas passage of a diesel engine.

* * * * *